UNITED STATES PATENT OFFICE.

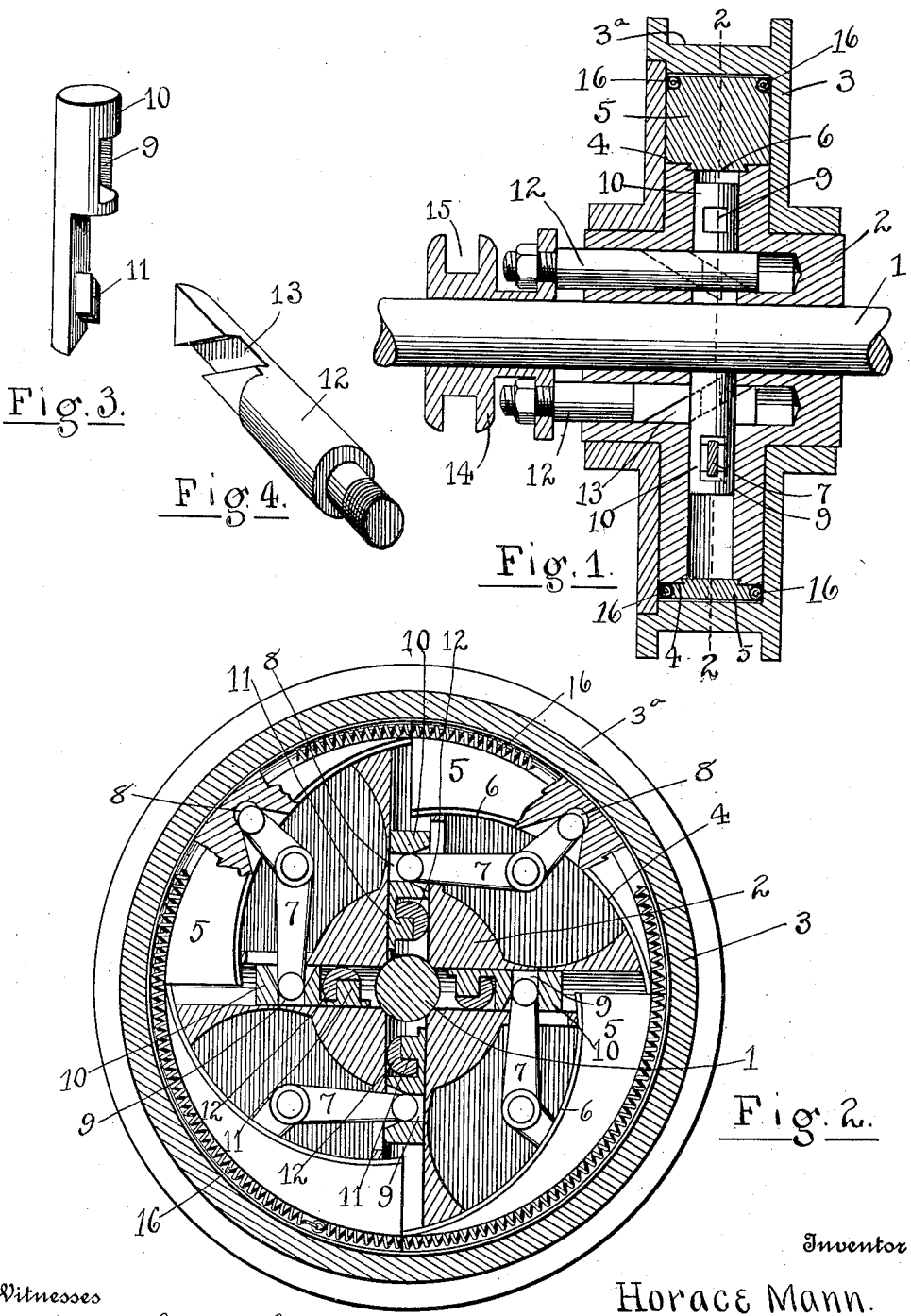

HORACE MANN, OF MUSKEGON, MICHIGAN.

CLUTCH.

1,077,728.  Specification of Letters Patent.  Patented Nov. 4, 1913.

Application filed October 2, 1912. Serial No. 723,541.

*To all whom it may concern:*

Be it known that I, HORACE MANN, a citizen of the United States of America, residing at Muskegon, in the county of Muskegon and State of Michigan, have invented certain new and useful Improvements in Clutches; and I do hereby declare the following to be a full, clear, and exact description of the invention, such as will enable others skilled in the art to which it appertains to make and use the same.

My invention relates to improvements in clutches and more particularly to the so-called internal expanding type, and its object is to provide a clutch of this character which will be positively operated in both directions, and to provide the same with various new and useful features hereinafter more fully described, and particularly pointed out in the claims.

This device consists essentially of a hub adapted to be fixed to a shaft and a drum surrounding the hub, the periphery of which may serve as a driving pulley. The hub also being provided with a series of eccentric surfaces and clutch members arranged to traverse these surfaces and engage the inner face of the drum to lock the same to the hub. A series of bell cranks are located in the hub and are actuated by radial and longitudinal rods to both positively engage or disengage the clutch members, said radial and longitudinal rods being slidable and having a cam and groove connection and are operated by a slidable collar which surrounds the shaft and is attached to the longitudinal rods. The device is also provided with various other new and useful features of construction and arrangement as will more fully appear by reference to the accompanying drawings, in which:

Figure 1 is an axial section of a device embodying my invention. Fig. 2 is a transverse section on the line 2—2 of Fig. 1. Fig. 3 is an enlarged perspective view of one of the radial rods; and Fig. 4 is an enlarged perspective view of one of the longitudinal rods.

Like numbers refer to like parts in all of the figures.

1 represents the shaft which may be either the driving or the driven shaft as desired.

2 is a hub fixed on the shaft and rotating therewith.

3 is a drum which is rotative upon and surrounds the hub. The periphery 3ª of this may serve as a pulley. The portion of the hub which lies within the drum is provided with a series of eccentric surfaces 4, four being shown in the drawings, and clutch members 5 are slidably mounted on these eccentric faces and are of such shape that when slid outward their combined surfaces will form practically a true circle and will engage the inner surface of the drum to lock it to the hub. The clutch members are preferably provided on their inner surfaces with dove-tail projections 6 which fit within and traverse dove-tail ways in the eccentric surfaces 4. The slidable clutch members are actuated by means of bell crank levers 7 which are pivoted in the hub, one end of each bell crank being inserted in a recess 8 in one of the clutch members 5 their opposite ends being inserted in the recesses 9 in radially slidable rods 10 there being one of these rods provided for each bell crank and clutch member. These radial rods are cut away or made thinner at their inner ends to allow longitudinally slidable rods 12 to lap over them. The ends of the longitudinal rods which overlap the radial rods being also cut away making them thinner at this point. The radial rods are provided with projections 11 which traverse inclined cam grooves 13 in the longitudinal rods. The ends of the longitudinal rods project outside of the hub and are attached to the collar 14 which surrounds the shaft, and is slidable thereon, said collar being provided with an annular groove 15 in which a yoke may be placed to operate the same. It will be seen that by sliding the collar 14 on the shaft the longitudinal rods in the hub will also be made to move which will actuate the radial rods 10 and move the bell crank levers 7. As the bell crank levers move the clutch members 5 are slid upon their respective eccentric faces and grip or release the inner surface of the drum 3. This movement also being positive to effectually release the drum.

When the clutch members 5 are slid back upon the eccentric faces and are disengaged from the drum it is desirable to provide the same with means to prevent them from inadvertently sliding outward by centrifugal force or vibration to reëngage the drum. This is done by laying a coiled spring 16 in a rabbet formed in the edges of the clutch member 5, said coiled spring having its ends attached to each other and formed in an annulus and exerting a constant tension on the clutch members to draw them inward and hold them out of engagement with the drum. The action of this spring is weak enough so that it may be easily overcome by operating the clutch members by means provided for that purpose.

When the drum is used as a driving member the rotation of the drum and shaft are preferably from left to right or a clockwise rotation as viewed in Fig. 2 so that the clutch members when once engaged will be wedged firmly into place by the power exerted through them. Should the shaft and hub be used as the driving members the rotation would preferably be the reverse or anti-clock wise for the same purpose.

What I claim is:

1. A clutch, comprising a hub, a drum surrounding the hub and independently rotative, eccentric faces on the hub, slidable clutch members on the eccentric faces to engage the inner surface of the drum, and positive means for actuating the clutch members into and out of engagement.

2. A clutch, comprising a hub, a drum surrounding the hub, and independently rotative, clutch members carried by the hub and frictionally engaging the drum, and means for positively moving the said members into engagement with the drum, and also adapted to positively move the same out of said contact.

3. A clutch, comprising a hub, a drum surrounding the hub and independently rotative, clutch members carried by the hub, adapted to engage the drum, radially slidable rods connected to said members to move the same in opposite directions, longitudinally slidable rods connected to the radially movable rods to move the same in both directions, and means for operating the last named rods.

4. A clutch, comprising a hub, a drum surrounding the hub and independently rotative eccentric faces on the hub, slidable clutch members on the eccentric faces, bell crank levers pivoted on the hub and connected to the clutch members to slide the same, radially slidable rods attached to the bell crank levers, longitudinally slidable rods overlapping the radial rods, said rods also having inclined cam grooves and projections to traverse the inclined grooves, and a slidable collar on the shaft to which the longitudinally slidable rods are attached.

5. A clutch, comprising a hub, a drum surrounding the hub, expanding members on the hub to engage the drum, bell cranks pivoted to the hub and attached to the expanding members to open and close the same, radially slidable rods in the hub attached to the bell crank levers, longitudinally slidable rods in the hub overlapping the radial rods, said rods having inclined cam grooves in the longitudinal rods and projections on the radial rods to traverse the cam grooves, and a slidable collar on the shaft to which the longitudinal rods are attached.

6. A clutch, comprising a hub adapted to be fixed on a shaft, a drum surrounding the hub, eccentric faces on the hub provided with dove-tail ways, dove-tail projections on the inner surfaces of the clutch members to traverse the dove-tail ways, an annular rabbet in the periphery of the clutch members, an annular coiled spring in the rabbet, bell crank levers pivoted in the hub and attached to the clutch members, radially slidable rods in the hub attached to the bell crank levers, longitudinally slidable rods in the hub overlapping the radial rods, said rods having inclined cam grooves in the longitudinal rods, and projections on the radial rods to traverse the inclined grooves, and a slidable collar on the shaft to which the longitudinal rods are attached.

In testimony whereof I affix my signature in presence of two witnesses.

HORACE MANN.

Witnesses:
HAROLD O. VAN ANTWERP,
LUTHER V. MOULTON.